United States Patent
Yoshimoto et al.

(10) Patent No.: US 6,727,675 B2
(45) Date of Patent: Apr. 27, 2004

(54) MOTOR CONTROL APPARATUS AND MOTOR CONTROL METHOD

(75) Inventors: Kantaro Yoshimoto, Yokohama (JP); Yasuhiko Kitajima, Kamakura (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/229,133

(22) Filed: Aug. 28, 2002

(65) Prior Publication Data

US 2003/0052641 A1 Mar. 20, 2003

(30) Foreign Application Priority Data

Sep. 10, 2001 (JP) ........................................ 2001-273515

(51) Int. Cl.$^7$ ................................................. H02P 1/46
(52) U.S. Cl. ........................ 318/700; 318/710; 318/721; 318/632; 318/629; 318/606
(58) Field of Search ................................... 318/432, 511, 318/811, 606, 607, 609, 610, 629, 632, 700, 710, 714, 721, 599

(56) References Cited

U.S. PATENT DOCUMENTS

| 5,796,228 | A | * | 8/1998 | Kojima et al. ............... 318/605 |
| 5,920,161 | A | * | 7/1999 | Obara et al. ................. 318/139 |
| 6,362,586 | B1 | * | 3/2002 | Naidu .......................... 318/432 |
| 6,426,605 | B1 | * | 7/2002 | Toliyat et al. ............... 318/801 |
| 2002/0097015 | A1 | * | 7/2002 | Kitajima et al. ............. 318/432 |

\* cited by examiner

Primary Examiner—Rina I Duda
(74) Attorney, Agent, or Firm—McDermott, Will & Emery (57) ABSTRACT

A motor control apparatus comprises a fundamental current control device that controls a fundamental current in a 3-phase AC motor in an orthogonal coordinate system constituted of a d-axis and a q-axis rotating in synchronization with the rotation of the 3-phase AC motor, a higher harmonic current control device that controls a higher harmonic current in the motor in an orthogonal coordinate system constituted of a dh-axis and a qh-axis rotating at a frequency that is an integral multiple of the frequency of the fundamental component of the current flowing to the motor, an estimating device that estimates the level of the harmonic speed electromotive force in the motor in the dhqh-axis coordinate system and a compensating device that compensates the harmonic speed electromotive force estimated by the estimating device.

11 Claims, 7 Drawing Sheets

MOTOR CONTROL APPARATUS AND MOTOR CONTROL METHOD

BACKGROUND OF THE INVENTION

1. Field of the Invention

The present invention relates to a motor control apparatus and motor control method, and more specifically, it relates to an apparatus of and method for controlling a motor to reduce the higher harmonic current flowing to a 3-phase AC motor.

2. Description of the Related Art

The applicant of the present invention has proposed a motor control apparatus that reduces the higher harmonic current flowing to a 3-phase AC motor (Japanese Patent Application No. 2000-356117). This motor control apparatus includes a fundamental current control system that controls a fundamental current in a dq-axis orthogonal coordinate system rotating in synchronization with the rotation of the 3-phase AC motor and a higher harmonic current control system that controls a higher harmonic current in a dhqh-axis orthogonal coordinate system (a higher harmonic coordinate system) rotating at a frequency that is an integral multiple of the frequency of the fundamental component of the motor current.

In a steady state, the fundamental current is a direct current and the higher harmonic current is an alternating current in the dq-axis coordinate system in this motor control apparatus. Accordingly, the higher harmonic current manifesting as the alternating current quantity is extracted from the current in the dq-axis coordinate system by using a high pass filter and the extracted current is converted to a higher harmonic current in the dhqh-axis higher harmonic coordinate system so as to handle the higher harmonic current as the quantity of direct current. In addition, a PI control circuit is employed in the higher harmonic current control system to realize higher harmonic current control with minimum control deviation.

SUMMARY OF THE INVENTION

However, since the harmonic speed electromotive force in the dhqh-axis higher harmonic coordinate system poses a disturbance to the higher harmonic current control system, the higher harmonic current control system cannot achieve quick response simply by providing the PI control circuit in the higher harmonic current control system and, consequently, there is a problem in that the higher harmonic current cannot be reduced to a sufficient degree.

An object of the present invention is to reduce the higher harmonic current flowing to a 3-phase AC motor.

The motor control apparatus according to the present invention comprises a fundamental current control device that controls a fundamental current in a 3-phase AC motor in an orthogonal coordinate system constituted of a d-axis and a q-axis (hereafter referred to as a dq-axis coordinate system) rotating in synchronization with the rotation of the 3-phase AC motor, a higher harmonic current control device that controls a higher harmonic current in the motor in an orthogonal coordinate system constituted of a dh axis and a qh axis (hereafter referred to as a dhqh-axis coordinate system) rotating at a frequency that is an integral multiple of the frequency of the fundamental component of the current flowing to the motor, an estimating device that estimates the level of the harmonic speed electromotive force in the motor in the dhqh-axis coordinate system and a compensating device that compensates the harmonic speed electromotive force estimated by the estimating device.

In the motor control method adopted in a motor control apparatus having a fundamental current control device that controls a fundamental current in a 3-phase AC motor in an orthogonal coordinate system constituted of a d-axis and a q-axis rotating in synchronization with the rotation of the 3-phase AC motor and a higher harmonic current control device that controls a higher harmonic current in the motor in an orthogonal coordinate system constituted of a dh-axis and a qh-axis rotating at a frequency that is an integral multiple of the frequency of a fundamental component of the current flowing to the motor, a harmonic speed electromotive force in the motor in the dhqh-axis coordinate system is estimated and the estimated harmonic speed electromotive force is compensated.

DETAILED DESCRIPTION OF THE PREFERRED EMBODIMENTS

First Embodiment

Figure 1:
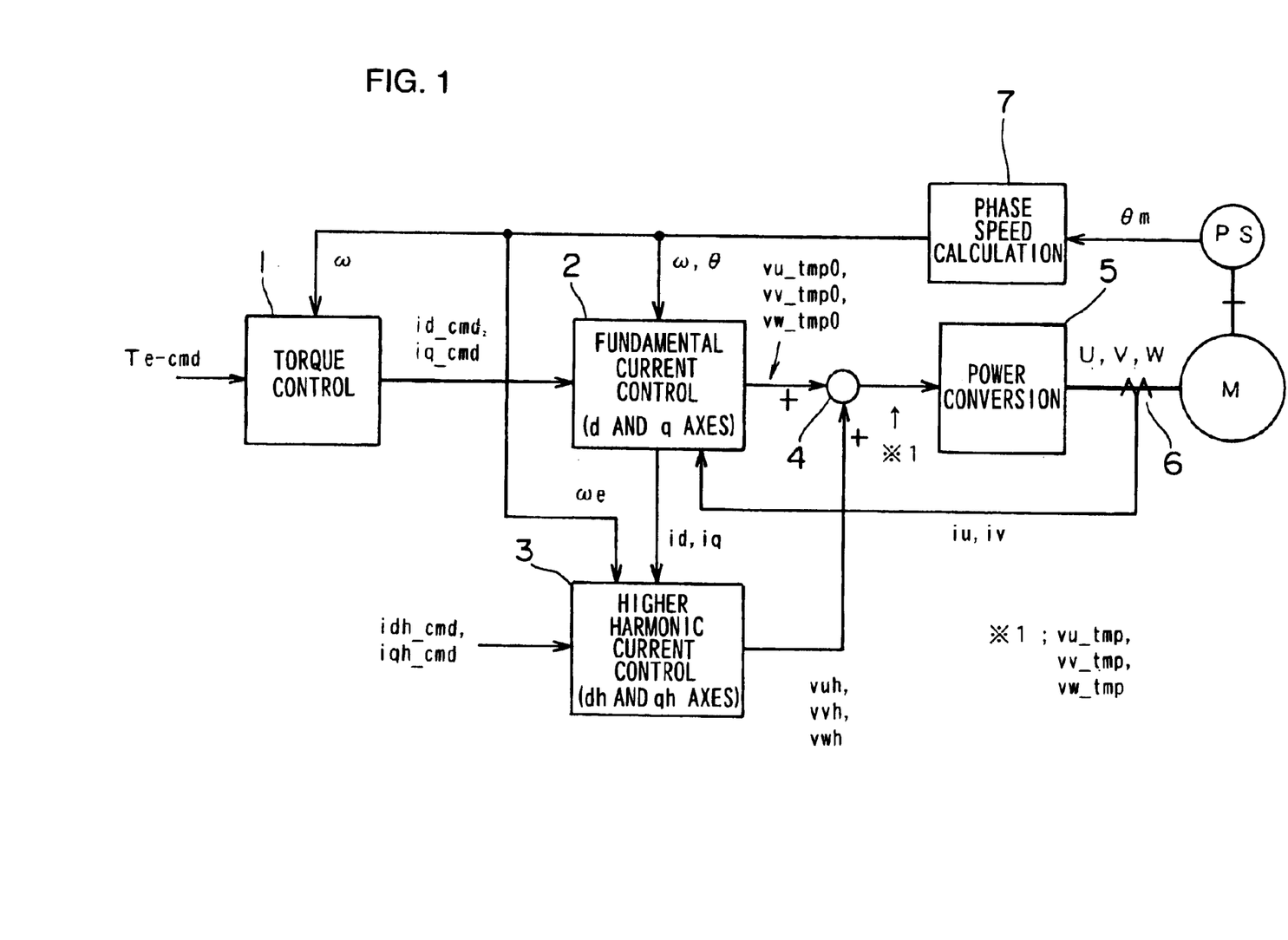
FIG. 1 illustrates the structure adopted in a first embodiment of the motor control apparatus according to the present invention.

FIG. 1 illustrates the structure adopted in the motor control apparatus in the first embodiment. The motor control apparatus in the embodiment implements vector control through which a torque control performance level comparable to that of control on a DC motor is achieved even when a 3-phase AC motor is used. It is to be noted that a motor M in the embodiment is a permanent magnet 3-phase synchronous motor.

A torque control circuit 1 calculates a d-axis fundamental current command value id_cmd and a q-axis fundamental current command value iq_cmd in a dq-axis coordinate system by using a current command value table (not shown) based upon a torque command value Te_cmd and an electrical rotation speed $\omega$ (to be detailed later) of the 3-phase synchronous motor M. The dq-axis coordinate system is an orthogonal coordinate system constituted of a d-axis and a q-axis, rotating at an electrical rotation speed which is an integral multiple of the mechanical rotation speed of the 3-phase synchronous motor M. Thus, in conjunction with a 3-phase synchronous motor, the dq-axis coordinate system rotates in synchronization with the motor rotation.

A fundamental current control circuit 2 controls a fundamental current in the dq-axis coordinate system. While further details are to be provided later, the fundamental current control circuit 2 converts actual currents iu and iv in the 3-phase synchronous motor M to actual currents id and iq along the d-axis and the q-axis respectively and calculates fundamental voltage command values vu_tmp0, vv_tmp0 and vq_tmp0 to be used to match the d-axis actual current id and the q-axis actual current iq with the fundamental current command values id_cmd and iq_cmd respectively.

A higher harmonic current control circuit 3 controls a higher harmonic current in a dhqh-axis higher harmonic coordinate system. The dhqh-axis higher harmonic coordinate system is an orthogonal coordinate system constituted of a dh-axis and a qh-axis, rotating at a frequency that is an integral multiple of the frequency of the fundamental components of the currents flowing to the 3-phase synchronous motor M. While further details are to be provided later, the higher harmonic current control circuit 3 extracts higher harmonic components idh and iqh in the dhqh-axis higher harmonic coordinate system from the d-axis actual current id and the q-axis actual current iq and calculates higher harmonic voltage command values vuh, vvh and vwh to be used to match the dh-axis higher harmonic current idh and the qh-axis higher harmonic current iqh with higher harmonic current command values idh_cmd and iqh_cmd respectively.

An adder 4 adds the higher harmonic voltage command values vuh, vvh and vwh obtained at the higher harmonic current control circuit 3 respectively to the fundamental voltage command values vu_tmp0, vv_tmp0 and vw_tmp0 obtained at the fundamental current control circuit 2, to calculate 3-phase AC voltage command values vu_tmp, vv_tmp and vw_tmp. A power conversion circuit 5 is an invertor constituted of a power conversion element such as an IGBT. The power conversion circuit 5 switches a DC voltage from a DC source (not shown) which may be a battery in conformance to the 3-phase voltage command values vu_tmp, vv_tmp and vw_tmp to generate 3-phase AC voltages U, V and W and then applies the 3-phase AC voltages thus generated to the 3-phase AC motor M.

An encoder PS, which is connected to the 3-phase synchronous motor M, detects the rotational position Om of the motor M. A current sensor 6 detects the actual current iu at a U-phase and the actual current iv at a V-phase in the 3-phase synchronous motor M. A phase speed calculating circuit 7 calculates the electrical rotation speed (angular speed) ω which is an integral multiple of the mechanical rotation speed (angular speed) ωm of the 3-phase synchronous motor M and also calculates an electrical rotational phase θ, based upon a motor rotational position signal θm provided by the encoder PS. It is to be noted that the electrical rotation speed (angular speed) e) indicates the frequency (angular frequency) of the AC currents flowing to the 3-phase synchronous motor M.

Figure 2:
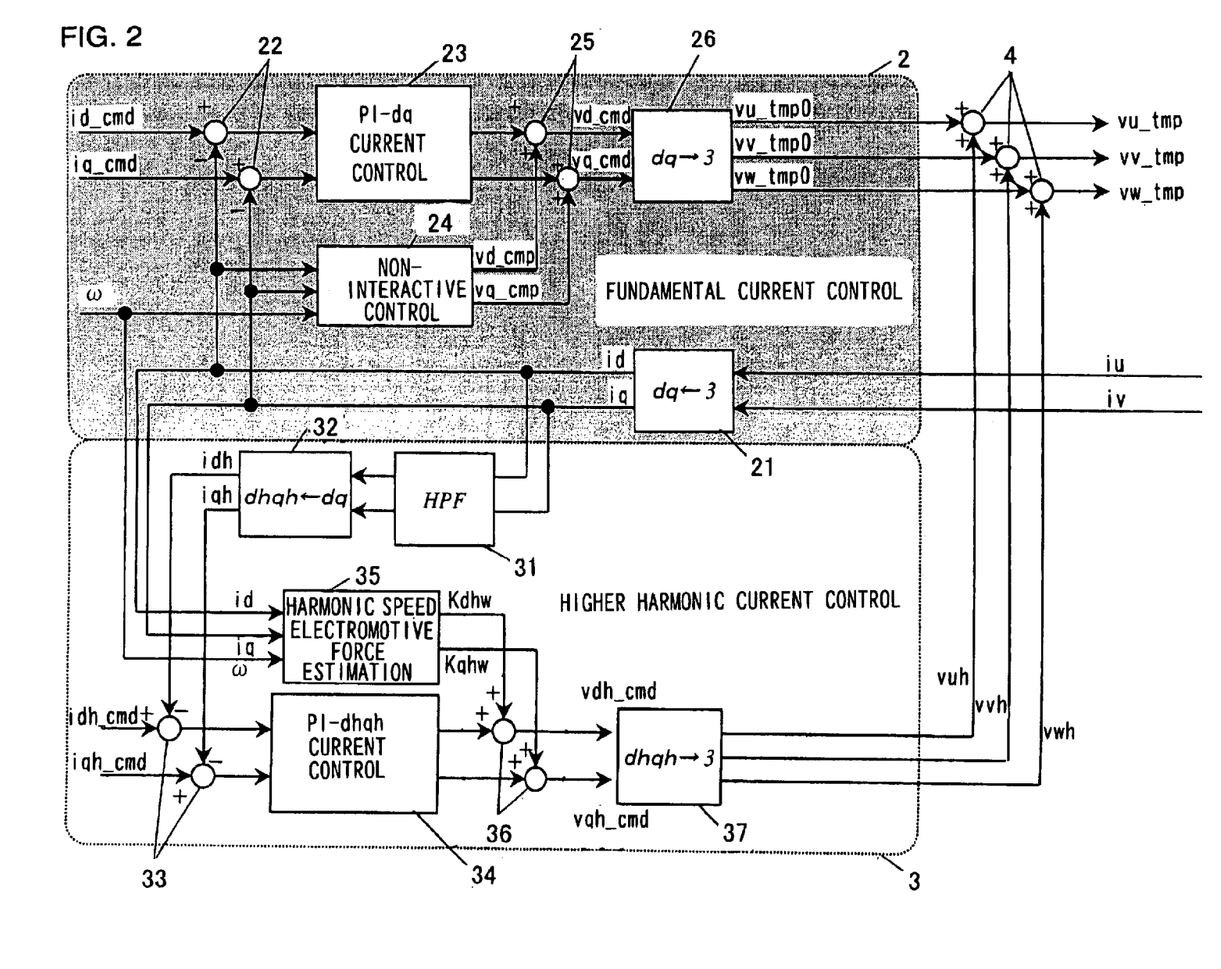
FIG. 2 shows in detail the structures adopted in the fundamental current control circuit and the higher harmonic current control circuit in the first embodiment.

FIG. 2 shows in detail the structures adopted in the fundamental current control circuit 2 and the higher harmonic current control circuit 3 in the first embodiment. In the first embodiment, a circuit for compensating the harmonic speed electromotive force at the motor M is added in conjunction with the fundamental current control circuit 2 and the higher harmonic current control circuit 3. The fundamental current control circuit 2 includes a 3-phase/dq conversion circuit 21, a subtractor 22, a PI-dq current control circuit 23, a non-interactive control circuit 24, an adder 25 and a dq/3-phase conversion circuit 26.

The 3-phase/dq conversion circuit 21 converts the actual currents iu and iv flowing in the 3-phase synchronous motor detected by the current sensor 6 to the d-axis actual current id and the q-axis actual current iq respectively. The subtractor 22 calculates the deviations (id_cmd−id, iq_cmd−iq) by subtracting the actual currents id and iq from the d-axis current command value id_cmd and the q-axis current command value iq_cmd respectively. The PI-dq current control circuit 23 calculates a d-axis voltage command value and a q-axis voltage command value by implementing a PI (proportional integral) control for the fundamental current deviations (id_cmd−id) and (iq_cmd−iq).

The non-interactive control circuit 24, which improves the response of the d-axis current and the q-axis current by compensating the speed electromotive force in the dq-axis coordinate system, calculates a d-axis compensating voltage vd_cmp and a q-axis compensating voltage vq_cmp for compensating the speed electromotive force in the dq-axis coordinate system. The adder 25 adds the d-axis compensating voltage vd_cmp and the q-axis compensating voltage vq_cmp respectively to the d-axis voltage command value and the q-axis voltage command value output from the PI-dq current control circuit 23, to calculate a d-axis voltage command value vd_cmd and a q-axis voltage command value vq_cmd.

The dq/3-phase conversion circuit 26 converts the d-axis voltage command value vd_cmd and the q-axis voltage command value vq_cmd to the U-phase fundamental voltage command value vu_tmp0, the V-phase fundamental voltage command value vv_tmp0, and the W-phase fundamental voltage command value vw_tmp0, in a 3-phase AC coordinate system.

The higher harmonic current control circuit 3 includes a high pass filter 31, a dq/dhqh conversion circuit 32, a subtractor 33, a PI-dhqh current control circuit 34, a harmonic speed electromotive force estimating circuit 35, an adder 36 and a dhqh/3-phase conversion circuit 37.

The high pass filter 31 extracts the higher harmonic components of the current flowing to the motor M by filtering the d-axis actual current id and the q-axis actual current iq obtained at the 3-phase/dq conversion circuit 21. The dq/dhgh conversion circuit 32 converts the higher harmonic currents extracted by the high pass filter 31 to a dh-axis higher harmonic current idh and a qh-axis higher harmonic current iqh. The subtractor 33 calculates the deviations (idh_cmd−idh) and (iqh_cmd−iqh) by subtracting the dh-axis higher harmonic current idh and the qh-axis higher harmonic current iqh from the dh-axis current command value $idh_{13}$ cmd and the qh-axis current command value iqh_cmd respectively. The PI-dhqh current control circuit 34 calculates a dh-axis voltage command value and a qh-axis voltage command value by implementing a PI (proportional integral) control for the higher harmonic current deviations (idh_cmd−idh) and (iqh_cmd−iqh).

The harmonic speed electromotive force estimating circuit 35 calculates a dh-axis harmonic speed electromotive force Kdhw and a qh-axis harmonic speed electromotive force Kqhw in order to improve the response of the dh-axis current and the qh-axis current by compensating the speed electromotive force in the dhqh-axis higher harmonic coordinate system. The method to be adopted to calculate the dh-axis harmonic speed electromotive force Kdhw and the qh-axis harmonic speed electromotive force Kqhw is to be detailed later. The adder 36 adds the dh-axis harmonic speed electromotive force Kdhw and the qh-axis harmonic speed electromotive force Kqhw respectively to the dh-axis voltage command value and the qh-axis voltage command value output from the PI-dhqh current control circuit 34 to calculate a dh-axis voltage command value vdh_cmd and a qh-axis voltage command value vqh_cmd.

The dhqh/3-phase conversion circuit 37 converts the dh-axis voltage command value vdh_cmd and the qh-axis voltage command value vqh_cmd to the U-phase higher harmonic voltage command value vuh, the V-phase higher harmonic voltage command value vvh and the W-phase higher harmonic voltage command value vwh in the 3-phase AC coordinate system.

As described above, the adder 4 adds the fundamental voltage command values vu_tmp0, vv_tmp0, and vw_tmp0, obtained at the fundamental current control circuit 2 respectively with the higher harmonic voltage command values vuh, vvh and vwh obtained at the higher harmonic current control circuit 3 for the individual phases to calculate the 3-phase AC voltage command values vu_tmp, vv_tmp and vw_tmp.

Now, the method adopted to calculate the dh-axis harmonic speed electromotive force Kdhw and the qh-axis harmonic speed electromotive force Kqhw in the harmonic speed electromotive force estimating circuit 35 is explained. The higher harmonic component of the inductance which causes the harmonic speed electromotive force is constituted of the spatial harmonic components of the self inductances at the U phase, the V phase and the W phase, which are expressed as 3-phase AC circuit equations. The self inductances Lu, Lv and Lw at the U phase, the V phase and the W phase are expressed as in (1) below.

$$L_u = L_{g0} + \sum L_n \cos 2n\theta \qquad (1)$$

$$L_v = L_{g0} + \sum L_n \cos n\left(2\theta + \frac{2}{3}\pi\right)$$

$$L_w = L_{g0} + \sum L_n \cos n\left(2\theta - \frac{2}{3}\pi\right)$$

In expression (1), Lg0 represents the DC component of the inductance in the 3-phase synchronous motor M, Ln (n=1, 2, ...) represents the AC component of the inductance in the motor M and θ represents the electrical rotational phase of the motor M mentioned earlier. When n=1, the second term on the right side indicates the saliency of an IPM motor assuming a standard internally embedded magnet structure. The higher harmonic components in the self inductances Lu, Lv and Lw at the individual phases when n≧2 poses as a possible cause for the generation of a harmonic speed electromotive force.

If a higher harmonic component is contained in the magnetic flux of the permanent magnet in a permanent magnet synchronous motor, the higher harmonic component generates a harmonic speed electromotive force. A circuit equation for the dq-axis coordinate system when n=2, 5, 8 ..., obtained by taking into consideration these inductances of higher order and the higher harmonic component in the magnetic flux of the permanent magnet is expressed as in (2) below.

$$\begin{bmatrix} V_d \\ V_q \end{bmatrix} = \begin{bmatrix} R & -L_{g0}\omega \\ L_{g0}\omega & R \end{bmatrix} \begin{bmatrix} i_d \\ i_q \end{bmatrix} + L_{g0}p\begin{bmatrix} i_d \\ i_q \end{bmatrix} + \qquad (2)$$

$$\begin{bmatrix} 0 \\ \omega\phi \end{bmatrix} + \begin{bmatrix} e_{dk} \\ e_{qk} \end{bmatrix} + \frac{L_1\omega}{2}\begin{bmatrix} 0 & 1 \\ 1 & 0 \end{bmatrix}\begin{bmatrix} i_d \\ i_q \end{bmatrix} + \frac{L_1}{2}\begin{bmatrix} 1 & 0 \\ 0 & -1 \end{bmatrix}\begin{bmatrix} pi_d \\ pi_q \end{bmatrix} +$$

$$(2n+1)\frac{L_n\omega}{2}\begin{bmatrix} \sin(-(2n+2)\theta) & -\cos(-(2n+2)\theta) \\ -\cos(-(2n+2)\theta) & -\sin(-(2n+2)\theta) \end{bmatrix}\begin{bmatrix} i_d \\ i_q \end{bmatrix} +$$

$$\frac{L_n}{2}\begin{bmatrix} \cos(-(2n+2)\theta) & \sin(-(2n+2)\theta) \\ \sin(-(2n+2)\theta) & -\cos(-(2n+2)\theta) \end{bmatrix}\begin{bmatrix} pi_d \\ pi_q \end{bmatrix}$$

While expression (2) includes "n" representing a single element, the corresponding terms should be incorporated into expression (2) if there are elements of any other orders. In expression (2), vd and vq respectively represent the d-axis voltage and the q-axis voltage, R represents the winding resistance in the motor M and ø represents the magnetic flux of the permanent magnet. In addition, edk represents the d-axis higher harmonic component in the speed electromotive force attributable to the magnetic flux of the permanent magnet and eqk represents the q-axis higher harmonic component in the speed electromotive force attributable to the magnetic flux of the permanent magnet. The term constituted of the product of ω, which is seen in the third column of expression (2), represents the harmonic speed electromotive force attributable to the higher harmonic components in the inductances.

A transformation matrix of the conversion from the dq-axis coordinate system to the dhqh-axis higher harmonic coordinate system is expressed as in (3) below.

$$[C] = \begin{bmatrix} \cos\theta_h & \sin\theta_h \\ -\sin\theta_h & \cos\theta_h \end{bmatrix} \qquad (3)$$

Expression (3) is based upon the premise that θh=−(2n+2) θ.

Assuming that the higher harmonic components in the magnetic flux of the permanent magnet are expressed as in (4), the circuit equation in the dhqh-axis higher harmonic coordinate system is expressed as in (5) below.

$$\begin{bmatrix} e_{dk} \\ e_{qk} \end{bmatrix} = \phi_5\omega\begin{bmatrix} \sin\theta_h \\ -\cos\theta_h \end{bmatrix} \qquad (4)$$

$$\begin{bmatrix} V_{dh} \\ V_{qh} \end{bmatrix} = \begin{bmatrix} R & (2n+1)L_{g0}\omega \\ -(2n+1)L_{g0}\omega & R \end{bmatrix}\begin{bmatrix} i_{dh} \\ i_{qh} \end{bmatrix} + L_{g0}p\begin{bmatrix} i_{dh} \\ i_{qh} \end{bmatrix} + \qquad (5)$$

$$\begin{bmatrix} e_{d0} \\ e_{q0} \end{bmatrix} + \begin{bmatrix} e_{dh} \\ e_{qh} \end{bmatrix} + (2n+3)\frac{L_1\omega}{2}\begin{bmatrix} \sin 2\theta_h & \cos 2\theta_h \\ \cos 2\theta_h & -\sin 2\theta_h \end{bmatrix}\begin{bmatrix} i_{dh} \\ i_{qh} \end{bmatrix} +$$

$$\frac{L_1}{2}\begin{bmatrix} \cos 2\theta_h & -\sin 2\theta_h \\ -\sin 2\theta_h & -\cos 2\theta_h \end{bmatrix}\begin{bmatrix} pi_{dh} \\ pi_{qh} \end{bmatrix} -$$

$$(2n+1)\frac{L_n\omega}{2}\begin{bmatrix} 0 & 1 \\ 1 & 0 \end{bmatrix}\begin{bmatrix} i_d \\ i_q \end{bmatrix} + \frac{L_n}{2}\begin{bmatrix} 1 & 0 \\ 0 & -1 \end{bmatrix}\begin{bmatrix} pi_d \\ pi_q \end{bmatrix}$$

In expression (4), ø5 represents the higher harmonic component of the fifth order in the magnetic flux of the permanent magnet. In expression (5), vdh and vqh represent the dh-axis voltage and the qh-axis voltage respectively. In addition, ed0 and eq0 represent speed electromotive forces obtained by converting the fundamental component ωø of the speed electromotive force attributable to the magnetic flux of the permanent magnet in the dq-axis coordinate system to values in the dhqh-axis coordinate system. edh and eqh represent harmonic speed electromotive forces obtained by converting the harmonic speed electromotive forces edk and eqk attributable to the magnetic flux of the permanent magnet in the dq-axis coordinate system to values in the dhqh-axis coordinate system. edh and eqh can be expressed as in (6) below when the higher harmonic components of the magnetic flux of the permanent magnet are expressed as in (4).

$$\begin{bmatrix} e_{dh} \\ e_{qh} \end{bmatrix} = \phi_5\omega\begin{bmatrix} 0 \\ -1 \end{bmatrix} \qquad (6)$$

When the conversion from the dq-axis coordinate system to the dhqh-axis higher harmonic coordinate system is performed, the dq-axis values can be converted to values in a coordinate system corresponding to the rotation of any higher harmonic current component among the higher harmonic current components contained in the motor current. When the largest higher harmonic current contained in the motor current is controlled, for instance, the term of the harmonic speed electromotive force constituting the cause for the generation of the higher harmonic current, too, is expressed as a direct current quantity.

The terms that include the speed ω appearing in the first and second columns and ed0 and eq0 in the first column in expression (5) are compensated through standard non-interactive control implemented in the dq-axis coordinate system. This leaves the term constituted of the higher harmonic components in the magnetic flux of the magnet in the first column and the term constituted of the motor inductance higher harmonic components in the third column, both representing harmonic speed electromotive forces, which slow down the current control response in the dhqh-axis higher harmonic coordinate system.

Accordingly, the harmonic speed electromotive force estimating circuit 35 ascertains a dh-axis component eLdh and a qh-axis component eLqh of the harmonic speed electromotive force attributable to the higher harmonic components in the inductances in the motor M based upon expression (5). The harmonic speed electromotive forces eLdh and eLqh attributable to the motor inductance higher harmonic components can be calculated as in (7) below based upon the order n of the motor inductance and the values of the components of that order (the motor inductance higher harmonic component), the d-axis fundamental current id and the q-axis fundamental current iq that have been detected and the electrical rotation speed ω of the motor M.

$$eL_{dh} = -(2n+1)\frac{L_n i_q \omega}{2} \quad (7)$$

$$eL_{qh} = -(2n+1)\frac{L_n i_d \omega}{2}$$

It goes without saying that since the motor inductance also changes in correspondence to the motor current value, Ln may be handled as a variable instead of a constant by referencing a table prepared in advance for an appropriate value or by expressing Ln as a function of the current.

In addition, the harmonic speed electromotive forces edh and eqh attributable to the higher harmonic component in the magnetic flux of the permanent magnet are expressed as in (6) as explained earlier. The estimated harmonic speed electromotive force values Kdhw and Kqhw, respectively representing the sums of the harmonic speed electromotive forces edh and eqh attributable to the higher harmonic components in the magnetic flux of the permanent magnet expressed in (6) and the harmonic speed electromotive forces eLdh and eLqh attributable to the higher harmonic components in the motor inductances expressed in (7), are calculated through the formulae in (8) below.

$Kdhw=edh+eLdh$ $Kqhw=eqh+eLqh \ldots$ (8)

The adder 36 shown in FIG. 2 adds harmonic speed electromotive force values Kdhw and Kqhw thus calculated to the output obtained by implementing the PI control on the dh-axis higher harmonic current and the qh-axis higher harmonic current, i.e., the output from the PI-dhqh current control circuit 34, to calculate the dh-axis voltage command value vdh_cmd and the qh-axis voltage command value vqh_cmd through the formulae in (9) below.

$$V_{dh\_cmd} = \left(K_{pdh} + \frac{K_{idh}}{s}\right)(i_{dh\_cmd} - i_{dh}) + K_{dhw} \quad (9)$$

$$V_{qh\_cmd} = \left(K_{pqh} + \frac{K_{iqh}}{s}\right)(i_{qh\_cmd} - i_{qh}) + K_{qhw}$$

In expression (9), Kpdh, Kpqh, Kidh and Kiqh each represent a constant used in the PI (proportional integral) operation control in the PI-dhqh current control circuit 34. Namely, Kpdh and Kpqh are the proportional constants along the dh-axis and the qh-axis respectively, whereas Kidh and Kiqh are the integral constants along the dh-axis and the qh-axis respectively. It is to be noted that by calculating (2n+1) Ln/2 in expression (7) in advance and providing it as a constant, the volume of the arithmetic operation can be reduced.

In the formulae in expression (9), both the harmonic speed electromotive forces attributable to the higher harmonic component in the magnetic flux of the permanent magnet and the harmonic speed electromotive forces attributable to the motor inductances higher harmonic components are estimated. However, if the effect of the harmonic speed electromotive forces attributable to the motor inductances higher harmonic components is insignificant but the harmonic speed electromotive forces attributable to the higher harmonic components in the magnetic flux of the permanent magnet is significant, only the harmonic speed electromotive forces attributable to the higher harmonic components in the magnetic flux of the permanent magnet expressed in (6) needs to be compensated. If, on the other hand, the effect of the harmonic speed electromotive forces attributable to the higher harmonic components in the magnetic flux of the permanent magnet is not significant but harmonic speed electromotive forces attributable to the motor inductance higher harmonic component is significant, only the harmonic speed electromotive forces attributable to the motor inductance higher harmonic component expressed in (7) needs to be compensated. In either of these cases, the harmonic speed electromotive force can be effectively compensated through a simple structure.

Figure 3:
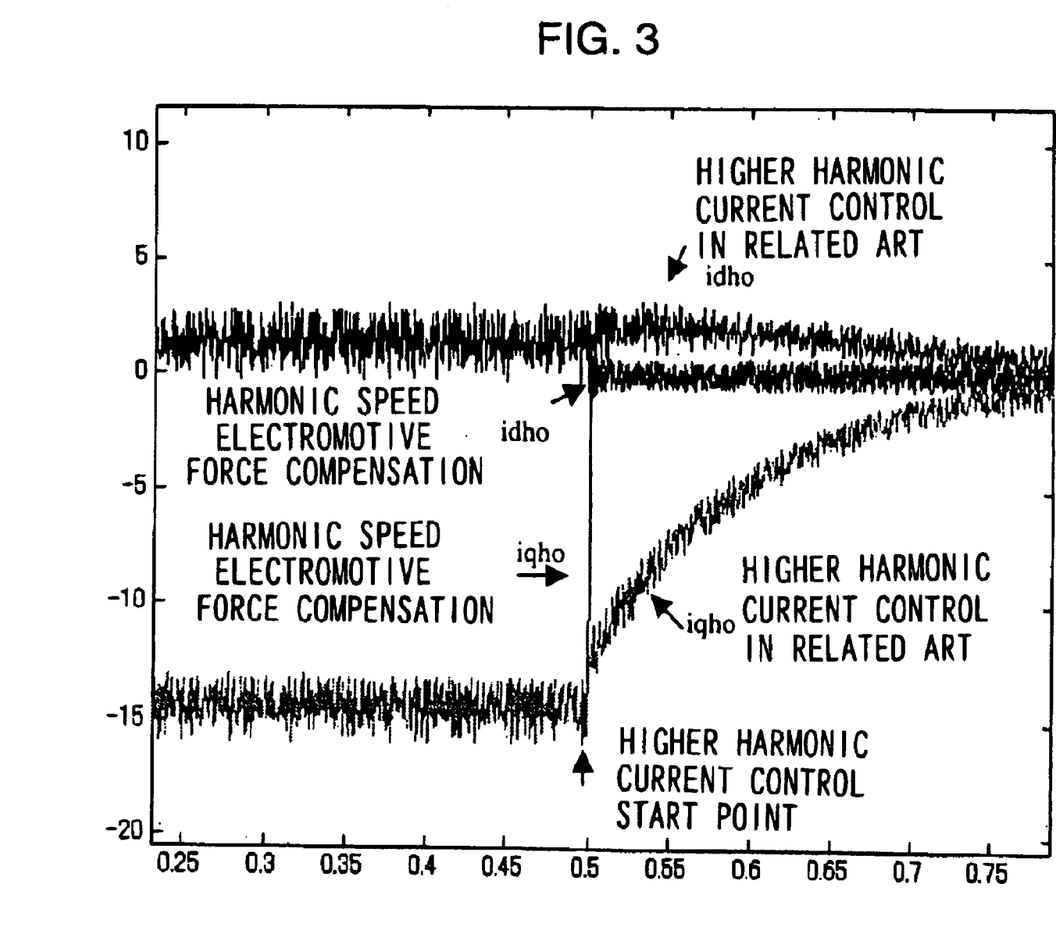
FIG. 3 presents the results of a simulation of the higher harmonic current control achieved in the first embodiment.

FIG. 3 presents the results of a simulation of the higher harmonic current control achieved in the embodiment. The results presented in FIG. 3 were obtained through a simulation conducted by implementing control of higher harmonic currents of the fifth order, i.e., by setting the current command values for the higher harmonic currents of the fifth order to 0. A comparison of the higher harmonic current control in the related art implemented without any harmonic speed electromotive force compensation and the higher harmonic current control achieved in the first embodiment by compensating the harmonic speed electromotive force reveals that compared to the control implemented in the related art, the control in the first embodiment greatly reduces the length of time elapsing between the control start and control convergence. In other words, by utilizing the motor control apparatus in the first embodiment, higher harmonic current control with quick response is realized and a highly efficient motor current control system can be realized through accurate control of the higher harmonic currents.

In the motor control apparatus in the first embodiment having the fundamental current control circuit 2 that controls the fundamental currents in the motor M in the dq-axis coordinate system rotating in synchronization with the rotation of the 3-phase synchronous motor M and the higher harmonic current control circuit 3 that controls the higher harmonic currents in the motor M in the dhqh-axis higher harmonic coordinate system rotating at a frequency that is an integral multiple of the frequency of the fundamental components of the currents flowing through the 3-phase synchronous motor M, the harmonic speed electromotive forces in the motor M in the dhqh-axis higher harmonic coordinate system is estimated and the estimated harmonic speed electromotive forces are compensated. In other words, since the compensation is achieved by adding the estimated harmonic speed electromotive force values to the higher harmonic voltage command values used to set the higher harmonic currents in the dhqh-axis coordinate system to 0, the harmonic speed electromotive forces which cause a disturbance to the higher harmonic current control is compensated to improve the response of the higher harmonic current control system and, as a result, more efficient and higher performance drive control of the 3-phase synchronous motor M is realized by reducing the higher harmonic currents.

It is to be noted that in the first embodiment, the higher harmonic voltage command values vdh_cmd and vqh_cmd in the dhqh-axis higher harmonic coordinate system are first converted to the voltage command values vuh, vvh and vwh in the 3-phase AC coordinate system and then the voltage command values vu_tmp, vv_tmp and vw_tmp in the 3-phase AC coordinate system are calculated by adding the voltage command values vu_tmp0, vv_tmp0, and vw_tmp0, output from the fundamental current control circuit 2 to the voltage command values vuh, vvh and vwh. However, the voltage command values vu_tmp, vv_tmp and vw_tmp in the 3-phase AC coordinate system may instead be calculated through dq/3-phase conversion after adding the higher harmonic voltage command values vdh_cmd and vqh_cmd in the dhqh-axis higher harmonic coordinate system to the fundamental voltage command values vd_cmd and vq_cmd in the dq-axis coordinate system. Alternatively, the higher harmonic voltage command values vdh_cmd and vqh_cmd in the dhqh-axis higher harmonic coordinate system may first be converted to higher harmonic voltage command values in an αβ axis coordinate system, the converted command values may be added with an α-axis fundamental voltage command value and a β-axis fundamental voltage command value and the sums may be converted to values in the 3-phase AC coordinate system to calculate 3-phase AC voltage command values.

Second Embodiment

Figure 4:
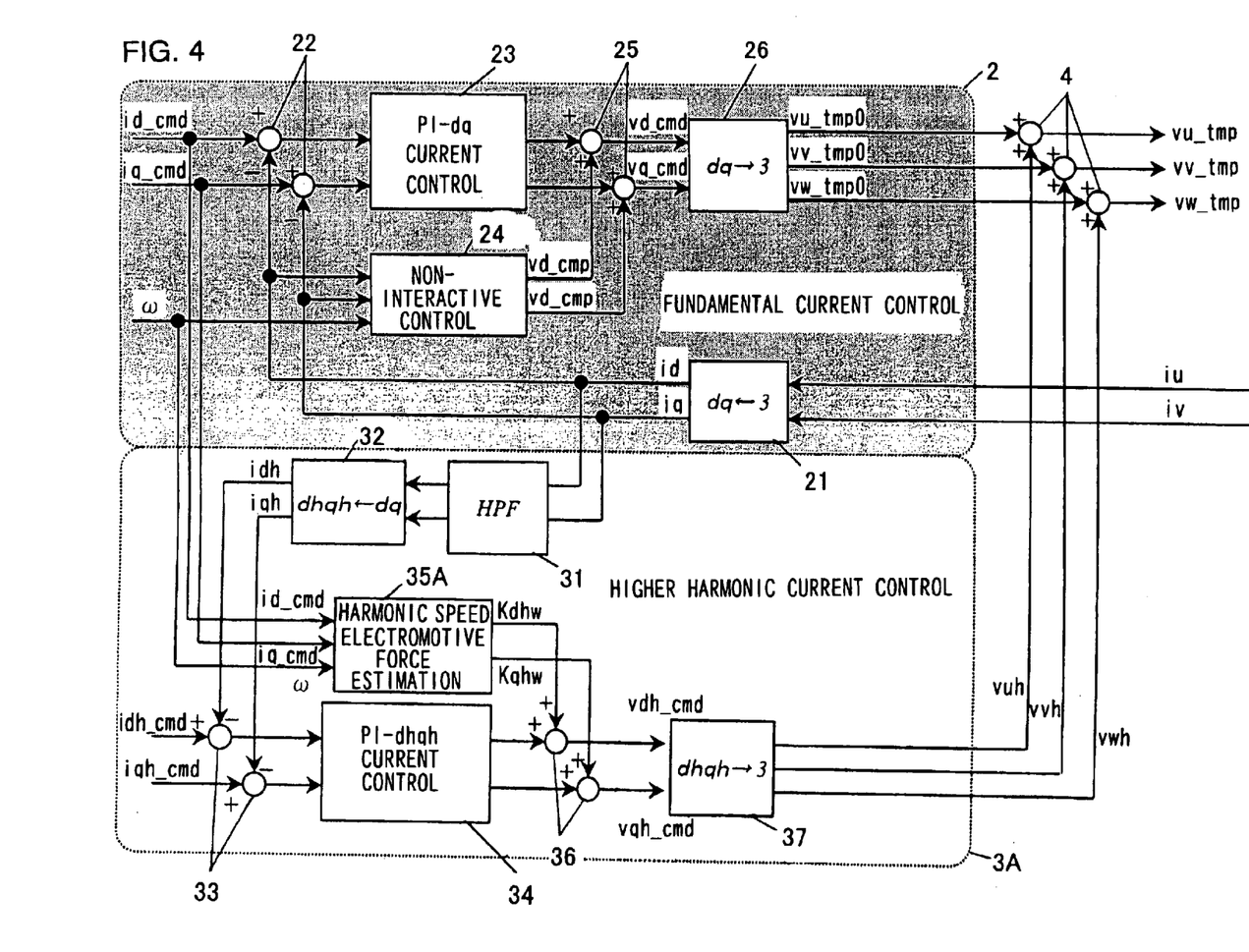
FIG. 4 shows in detail the structures adopted in the fundamental current control circuit and the higher harmonic current control circuit in a second embodiment.

FIG. 4 shows in detail the structures assumed in the fundamental current control circuit 2 and a higher harmonic current control circuit 3A in the second embodiment. It is to be noted that since the overall structure of the motor control apparatus achieved in the second embodiment is similar to the structure shown in FIG. 1, its illustration and explanation are omitted. In addition, the same reference numerals are assigned to components similar to those in FIG. 2 to focus on an explanation of the features that differentiate the second embodiment. While the d-axis actual current id and the q-axis actual current iq are input to the harmonic speed electromotive force estimating circuit 35 in the first embodiment, the d-axis current command value id_cmd and the q-axis current command value iq_cmd are input to the harmonic speed electromotive force estimating circuit 35A in the second embodiment.

By using the current command values id_cmd and iq_cmd instead of the d-axis actual current id and the q-axis actual current iq, the adverse effect of noise and the like contained in the actual currents id and iq detected by the current sensor 6 is eliminated. Namely, the harmonic speed electromotive forces eLdh and eLqh attributable to the higher harmonic components in the inductances can be estimated with a higher degree of accuracy. In addition, since an arithmetic operation is performed to estimate the harmonic speed electromotive force values Kdhw and Kqhw during each cycle of the arithmetic operation executed to calculate the current command values id_cmd and iq_cmd, the cycle of the arithmetic operation for estimating the harmonic speed electromotive forces becomes longer than the cycle of the current control. As a result, the harmonic speed electromotive force values Kdhw and Kqhw can be estimated without having to increase the volume of the arithmetic operation performed in the current control cycle.

Third Embodiment

Figure 5:
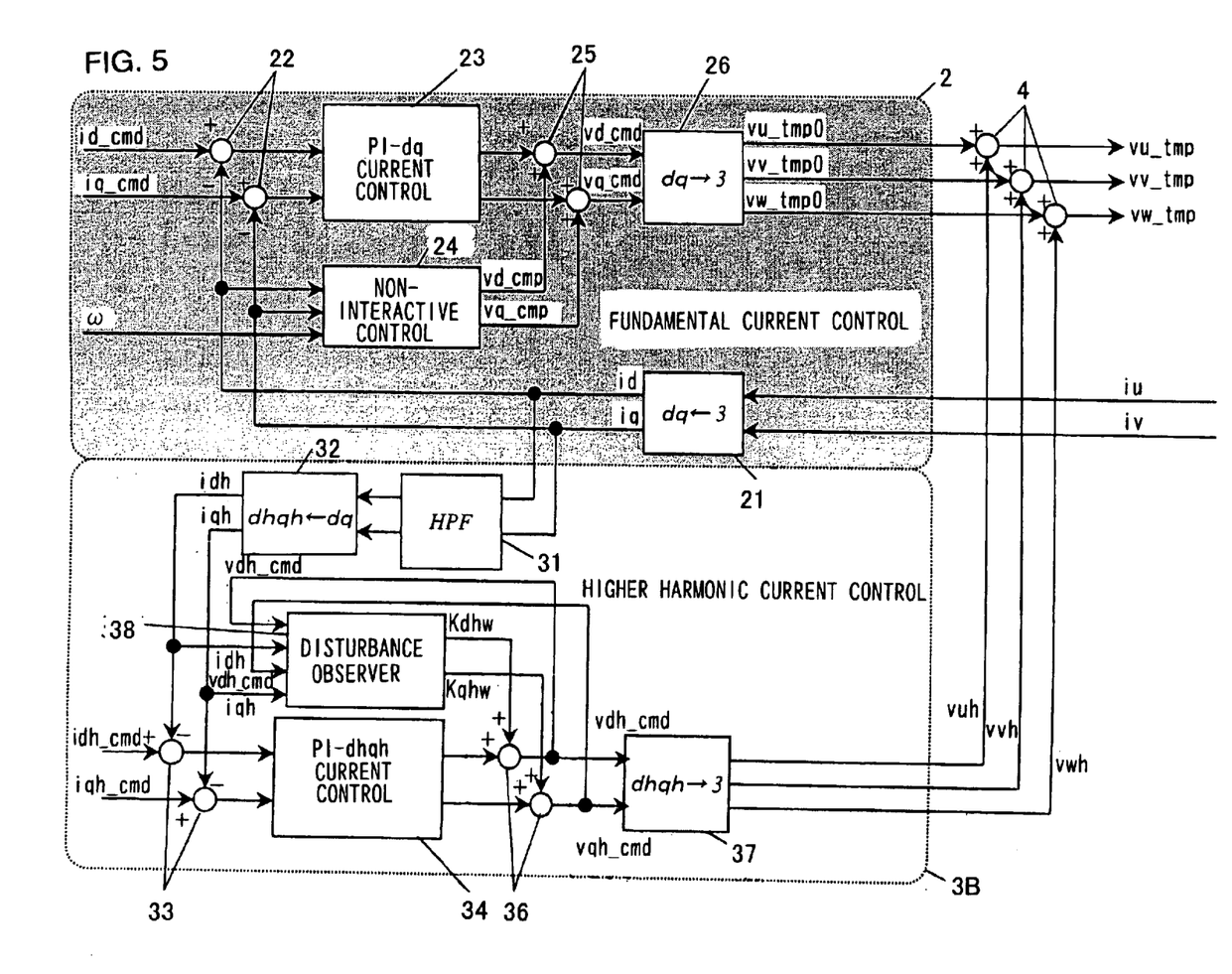
FIG. 5 shows in detail the structures adopted in the fundamental current control circuit and the higher harmonic current control circuit in a third embodiment.

FIG. 5 shows in detail the structures assumed in the fundamental current control circuit 2 and a higher harmonic current control circuit 3B in the third embodiment. It is to be noted that since the overall structure of the motor control apparatus achieved in the third embodiment is similar to the structure shown in FIG. 1, its illustration and explanation are omitted. In addition, the same reference numerals are assigned to components similar to those in FIG. 2 to focus on an explanation of the features that differentiate the third embodiment. In the first embodiment explained earlier, the harmonic speed electromotive force estimating circuit 35 is employed to estimate the harmonic speed electromotive force values Kdhw and Kqhw. In the third embodiment, a disturbance observer 38 is employed in place of the harmonic speed electromotive force estimating circuit 35 to estimate the harmonic speed electromotive force values Kdhw and Kqhw.

Figure 6:
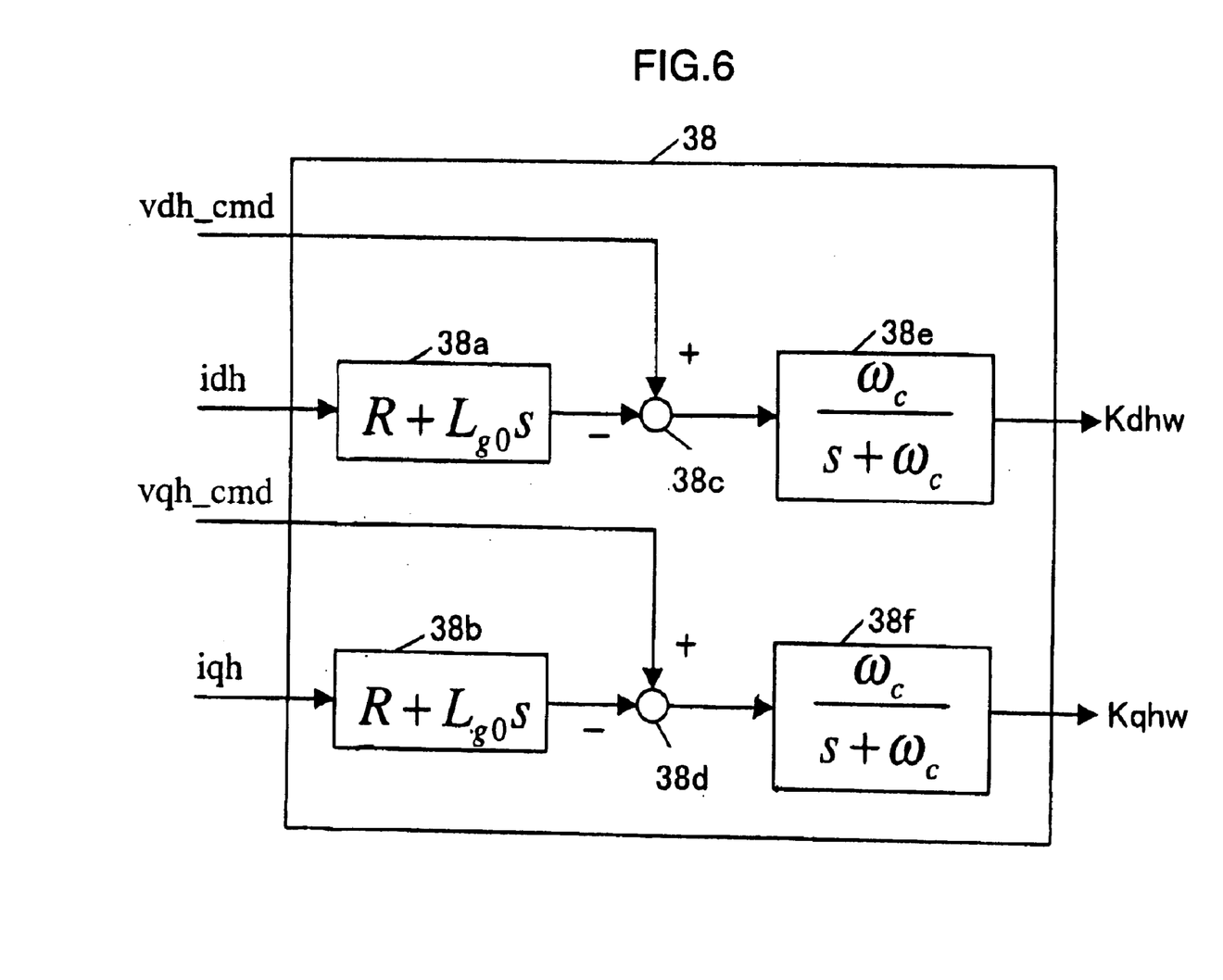
FIG. 6 shows in detail the structure adopted in the disturbance observer in the third embodiment.

FIG. 6 shows the structure adopted in the disturbance observer 38. The dh-axis higher harmonic current idh and the qh-axis higher harmonic current iqh, the dh-axis higher harmonic voltage command value vdh_cmd and the qh-axis higher harmonic voltage command value vqh_cmd are input to the disturbance observer 38. Inverse systems 38a and 38b of the plant (the control target, i.e., the 3-phase synchronous motor M) to be used in the disturbance observer 38 are achieved through approximation based upon the resistance R and the inductance Lg0 of the motor M representing the typical characteristics in the circuit equation (5). After the subtractors 38c and 38d respectively subtract the values obtained at the plant inverse systems 38a and 38b from dh-axis higher harmonic voltage command value vdh_cmd and the qh-axis higher harmonic voltage command value vqh_cmd, the adverse effect of noise is reduced through filters 38e and 38f. As a result, harmonic speed electromotive force values Kdhw and Kqhw which vary at a lower frequency compared to the cut-off frequency at the filters 38e and 38f can be obtained through the arithmetic operation.

It is to be noted that while primary low pass filters are used as the filters 38e and 38f in the third embodiment, secondary low pass filters may be utilized instead. In addition, instead of performing approximation by using the resistance R and the inductance Lg0 of the motor M to achieve the inverse systems of the plant, the plant characteristics may be determined in conformance to the frequency characteristics of the motor M.

By adding the harmonic speed electromotive force values Kdhw and Kqhw estimated by the disturbance observer 38 to the dh-axis higher harmonic voltage command value and the qh-axis higher harmonic voltage command value output by the PI-dhqh current control circuit 34, the adverse effect of the harmonic speed electromotive force can be reduced.

Figure 7:
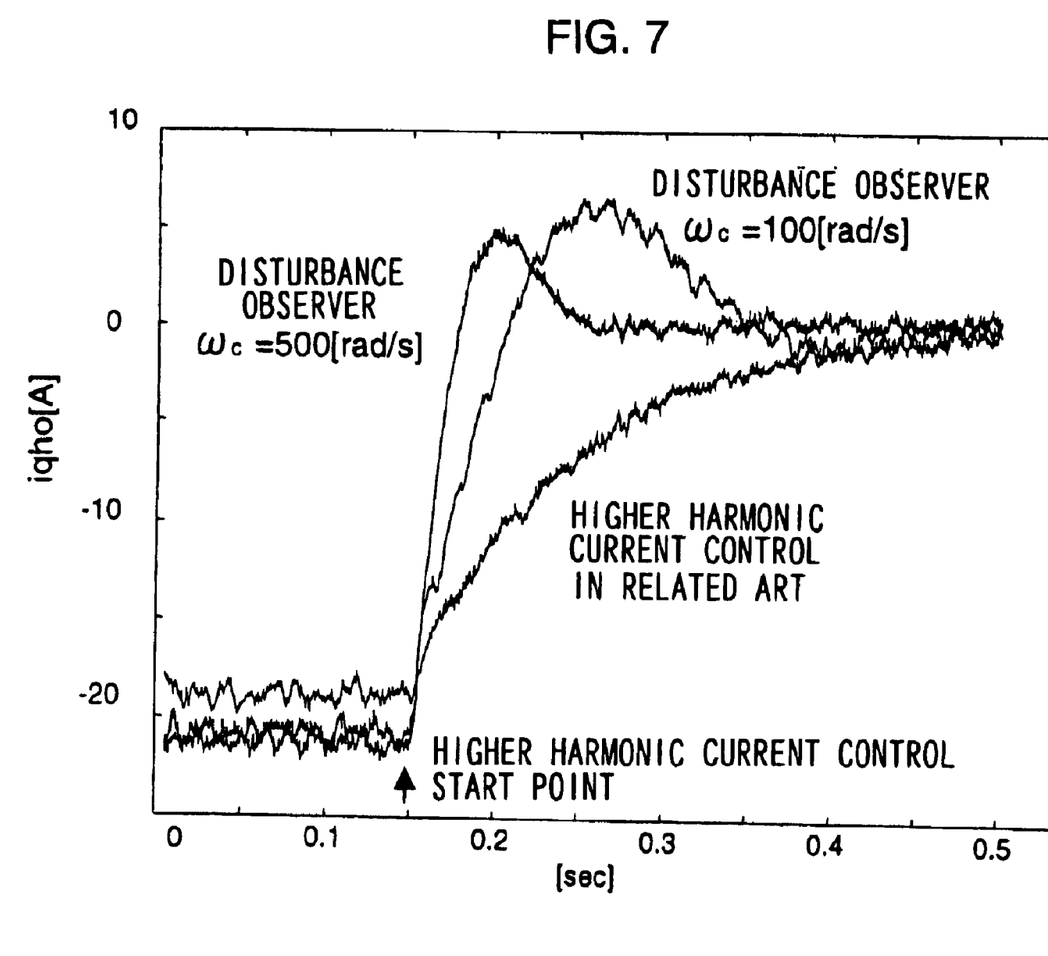
FIG. 7 presents the results of a simulation of the higher harmonic current control achieved in the third embodiment.

In the third embodiment, the harmonic speed electromotive force can be estimated and compensated even when the higher harmonic components of the motor inductances are not known or when they change, or even when the higher harmonic component in the magnetic flux of the permanent magnet are not known. FIG. 7 presents the results of a simulation of the higher harmonic current control achieved in the third embodiment. FIG. 7 shows the results of a simulation of control implemented on a fifth-order higher harmonic current contained in the motor current. The fifth-order higher harmonic current command value is set to 0. While the point in time at which convergence occurs varies in correspondence to the pole ωc of the disturbance observer 38, a comparison of the higher harmonic current control in the related art implemented without compensating the harmonic speed electromotive force and the higher harmonic current control achieved in the third embodiment by compensating the harmonic speed electromotive force reveals that the third embodiment realizes quicker response compared to the prior art. It is to be noted that instead of a disturbance observer adopting the structure described above, which is employed in the third embodiment, an identity observer achieved based upon an equation of state or a finite setting time observer may be utilized.

The above described embodiments are examples, and various modifications can be made without departing from the spirit and scope of the invention. While a permanent magnet 3-phase synchronous motor is used in the explanation of the embodiments given above, the type of motor is not limited to that of the embodiments and a 3-phase inductive motor, for instance, may be used instead.

The disclosure of the following priority application is herein incorporated by reference: Japanese Patent Application No. 2001-273515 filed Sep. 10, 2001.

What is claimed is:

1. A motor control apparatus, comprising:
   a fundamental current control device that controls a fundamental current in a 3-phase AC motor in a dq-axis coordinate system which is an orthogonal coordinate system constituted of a d-axis and a q-axis rotating in synchronization with rotation of the 3-phase AC motor;
   a higher harmonic current control device that controls a higher harmonic current in the motor in a dhqh-axis coordinate system which is an orthogonal coordinate system constituted of a dh-axis and a q-axis rotating at a frequency that is an integral multiple of the frequency of a fundamental component of a current flowing to the motor;
   an estimating device that estimates the harmonic speed electromotive force in the motor in the dhqh-axis coordinate system; and
   a compensating device that compensates the harmonic speed electromotive force estimated by the estimating device.

2. A motor control apparatus according to claim 1, wherein:
   the higher harmonic current control device outputs a higher harmonic voltage command value to be used to set the higher harmonic current in the dhqh-axis coordinate system to 0; and
   the compensating device compensates the harmonic speed electromotive force by adding the estimated value for the harmonic speed electromotive force to the higher harmonic voltage command value.

3. A motor control apparatus according to claim 1, wherein:
   the estimating device estimates a harmonic speed electromotive force attributable to a higher harmonic component in an inductance of the motor.

4. A motor control apparatus according to claim 1, wherein:
   the 3-phase AC motor is a permanent magnet synchronous motor; and
   the estimating device estimates a harmonic speed electromotive force attributable to a higher harmonic component in the magnetic flux of the permanent magnet in the motor.

5. A motor control apparatus according to claim 1, wherein:
   the 3-phase AC motor is a permanent magnet synchronous motor; and
   the estimating device estimates a harmonic speed electromotive force attributable to a higher harmonic component in the magnetic flux of the permanent magnet in the motor and a higher harmonic component in an inductance of the motor.

6. A motor control apparatus according to claim 3, wherein:
   the estimating device estimates the harmonic speed electromotive force attributable to the inductance of the motor based upon a fundamental current command value of the motor in the dq-axis coordinate system, an electrical rotation speed of the motor and the higher harmonic component m the inductance.

7. A motor control apparatus according to claim 3, wherein:
   the estimating device estimates the harmonic speed electromotive force attributable to the inductance of the motor based upon a d-axis fundamental current and a q-axis fundamental current in the motor, an electrical rotation speed of the motor and the higher harmonic component in the inductance.

8. A motor control apparatus according to claim 4, wherein:
   the estimating device estimates the harmonic speed electromotive force attributable to the higher harmonic component in the magnetic flux of the permanent magnet in the motor based upon the higher harmonic component in the magnetic flux of the permanent magnet in the motor and an electrical rotation speed of the motor.

9. A motor control apparatus according to claim 1, wherein:
   the estimating device is a disturbance observer constituted by using a resistance of the motor and a fundamental component of inductances in the motor as a parameter.

10. A motor control apparatus, comprising:
    a fundamental current control means for controlling a fundamental current in a 3-phase AC motor in a dq-axis coordinate system which is an orthogonal coordinate system constituted of a d-axis and a q-axis rotating in synchronization with the rotation of the 3-phase AC motor;
    a higher harmonic current control means for controlling a higher harmonic current in the motor in a dhqh-axis coordinate system which is an orthogonal coordinate system constituted of a dh-axis and a qh-axis rotating at a frequency that is an integral multiple of the frequency of a fundamental component of the current flowing to the motor;

an estimation means for estimating the harmonic speed electromotive force in the motor in the dhqh-axis coordinate system; and a compensation means for compensating the harmonic speed electromotive force estimated by the estimation means.

11. A motor control method adopted in a motor control apparatus having a fundamental current control device that controls a fundamental current in a 3-phase AC motor in an orthogonal coordinate system constituted of a d-axis and a q-axis rotating in synchronization with the rotation of the 3-phase AC motor and a higher harmonic current control device that controls a higher harmonic current in the motor in a dhqh-axis coordinate system which is an orthogonal coordinate system constituted of a dh-axis and a qh-axis rotating at a frequency that is an integral multiple of the frequency of a fundamental component of the current flowing to the motor, comprising:

estimating a harmonic speed electromotive force in the motor in the dhqh-axis coordinate system; and compensating the estimated harmonic speed electromotive force.

* * * * *